United States Patent
Tokumaru et al.

[11] 4,234,894
[45] Nov. 18, 1980

[54] REFLECTING OPTICAL SYSTEM FOR PROJECTION TELEVISION

[75] Inventors: Hisashi Tokumaru, Osaka; Mitsuo Yasukuni, Sakai, both of Japan

[73] Assignee: Minolta Camera Kabushiki Kaisha, Osaka, Japan

[21] Appl. No.: 955,097

[22] Filed: Oct. 26, 1978

[30] Foreign Application Priority Data

Nov. 2, 1977 [JP] Japan ............... 52-131807

[51] Int. Cl.³ ............ H04N 5/72; G02B 17/00; G02B 9/34
[52] U.S. Cl. .................. 358/250; 358/238; 358/239; 350/199; 350/200; 350/220
[58] Field of Search ......... 358/238, 239; 350/220, 350/189, 200, 199

[56] References Cited

U.S. PATENT DOCUMENTS

| 2,458,132 | 1/1949 | Baker | 358/239 |
| 2,466,329 | 4/1949 | Samson et al. | 358/239 |
| 2,960,615 | 11/1960 | Harries | 358/238 |
| 4,073,574 | 2/1978 | Clarke et al. | 350/189 |

*Primary Examiner*—Robert L. Griffin
*Assistant Examiner*—Edward L. Coles
*Attorney, Agent, or Firm*—Jackson, Jones & Price

[57] ABSTRACT

A projection television system having a light emitting target and a screen for realizing a projected video image is provided with an improved reflecting optical system which provides enhanced resolution and uniform correction of aberrations across a projected image. The optical system includes a concave mirror, positioned adjacent the light emitting target, for reflecting the video image towards the display screen. An optical compensating plate having at least one aspherical surface is located on the optical path. A meniscus lens is also located in the optical path. Both the optical compensating member and the meniscus lens can be positioned outside the vacuum envelope of the target and the electron gun to simplify alignment and construction.

9 Claims, 9 Drawing Figures

REFLECTING OPTICAL SYSTEM FOR PROJECTION TELEVISION

BACKGROUND OF THE INVENTION

1. Field of the Invention

The present invention relates to an optical system for projection television having a large aperture ratio and a relatively wide field angle, more particularly the present invention provides improved resolution with uniform correction of aberrations across the entire projected image.

2. Description of the Prior Art

Recently in commercial establishments and also in home use, projection television has become more popular. Problems, however, have limited the acceptability of this form of entertainment because of the cost and image quality.

Reflecting optical systems have been widely employed for projecting the video image on a large display screen. These optical systems, however, have experienced many problems with regard to correction of aberrations that are generated by the magnification of the images. As noted in U.S. Pat. No. 4,073,574 both Schmidt systems and meniscus lens systems have been employed in efforts to correct aberrations resulting from reflecting optical systems. The Schmidt system attempts to correct the spherical aberration generated by a concave mirror by a so called Schmidt plate having an aspherical surface. The Schmidt system, however, has a disadvantage in that while it is capable of providing a complete aberration correction for a selected given point on the display screen, it still provides a residual aberration which increases with distance from that point, thus causing a considerable image degradation. As can be readily appreciated, since the field angle in these video optical systems are usually at least 40 degrees in width at a minimum, the Schmidt system results in inadequate sharpness in the zonial and marginal areas of the display screen.

The use of a meniscus lens system on the other hand permits a uniform aberration correction across the entire area of the screen, however, the overall degree of correction is fairly low and hence the result is not satisfactory.

The prior art is still attempting to provide improved image resolution at an economical cost to increase the market for projection television systems.

SUMMARY OF THE INVENTION

It is an object of the present invention to provide an improved reflecting optical system having a large aperture ratio of at least 1/0.7 to provide a satisfactory image projection over a field angle of greater than 40 degrees. This projected image will cover the entire area of the display screen from the center to the marginal area of the screen and further meet the requirements of a high grade T.V. video projector having a resolution capacity of not less than 1,000 T.V. lines.

It is another object of the present invention to provide a reflecting optical system which is relatively uncomplicated in manufacturing and assembling. More particularly, the present invention permits the mounting and alignment of both the meniscus lens and compensating plate outside of the vacuum tube envelope which surrounds the electron gun and light emitting target surface.

The projection television system includes a light emitting target such as fluorescent and a screen for realizing a projected video image. The reflecting optical system compliments this television system and defines an optical path for projecting the video image onto the screen. A concave mirror is positioned adjacent the light emitting target for reflecting the image toward the screen. A meniscus lens is located in the optical path and is convex towards the screen. An optical compensating member having an aspherical surface is positioned in the path, whereby the aspherical surface coefficient, $C_2$; radius of curvature of the inside surface of the meniscus lens, R, and the focal length, f, of the entire optical system satisfies the following conditions;

$$10^{-2}/f^4 < |C_2| < 10^2/f^4 \tag{1}$$

$$0.6f < |R| < 1.2f \tag{2}$$

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENT

The following description is provided to enable any person skilled in the video and optical field to make and use the invention and it sets forth the best mode contemplated by the inventors of carrying out their invention. Various modifications, however, will remain readily apparent to those skilled in the above art, since the generic principles of the present invention have been defined herein specifically to provide a relatively economical and easily manufactured reflecting optical system for a projection television.

Figure 1:
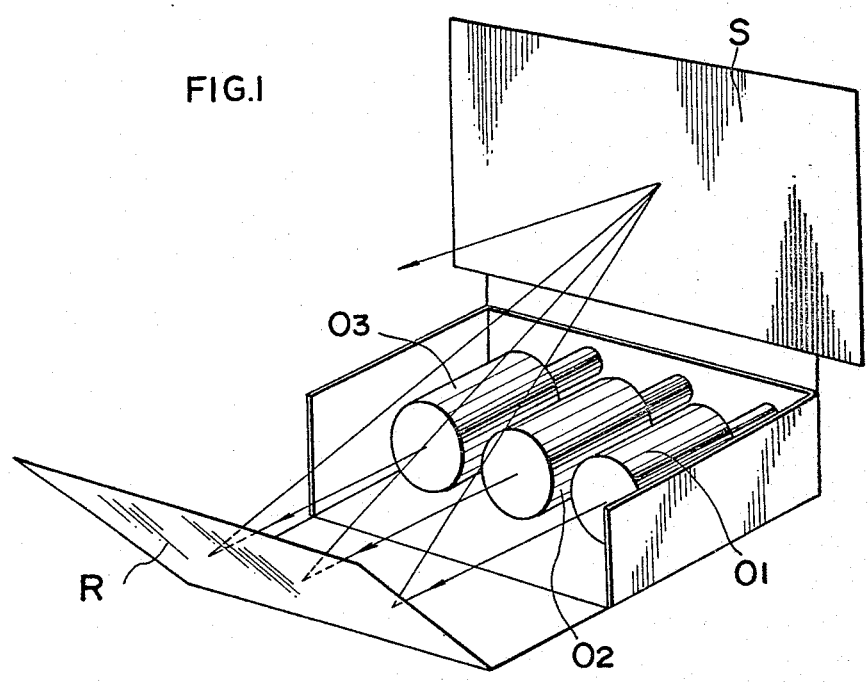
FIG. 1 represents a schematic perspective view showing an example of a projection television system.

Referring to FIG. 1, a general example of a projection television system is disclosed in a schematic embodiment. The video system is a color television of a three tube type. In the figure, $O_1$, $O_2$ and $O_3$ represent respectively reflecting optical systems including a vacuum tube to enclose an electron gun and a fluorescent target. Each of the reflecting optical systems pertain respectively to a red, blue and green light component which are subsequently combined together to provide a composite color image. Thus, the video image is generated by the respective reflecting optical systems, $O_1$, $O_2$ and $O_3$ and projected towards a slightly concave screen, S, by means of reflection from the mirror, R. The screen, S, is slightly concave for effectively directing the light reflected from the screen towards a viewer.

The present invention relates to an improvement in the reflecting optical system for a projection television and could be utilized in each of the optical systems disclosed in FIG. 1, such a $O_1$, $O_2$ and $O_3$.

Figure 2:
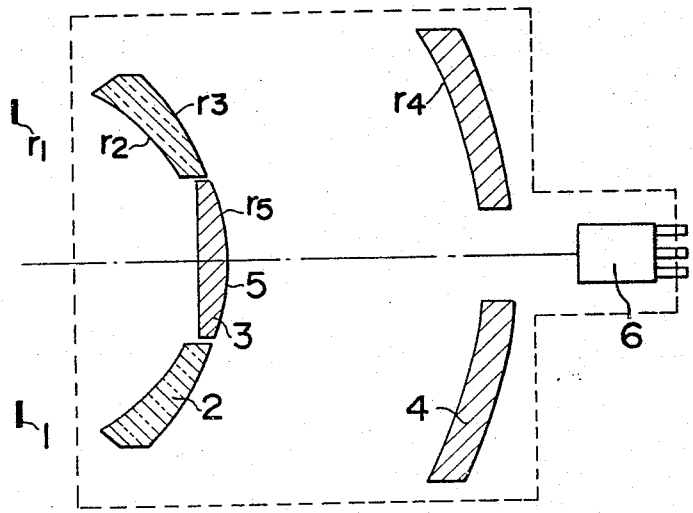
FIG. 2 represents a schematic cross sectional view of a prior art reflecting optical system.

FIG. 2 is a schematic diagram which, for reference's sake, discloses a T.V. projector utilizing a prior art meniscus lens optical system. This optical system comprises a diaphragm (1), a meniscus lens (2) and a target (3). A reflecting concave mirror (4) has a central opening through which the electron beam from an electron gun (6) scans the surface of a fluorescent coating (5) on the surface $r_5$ of a light emitting target (3). In the same figure of the drawing, the part encircled by the dotted line is generally sealed by a vacuum envelope. The image formed by the electron beam incident on the fluorescent coating (5) of the target (3) is reflected forward by the reflecting concave mirror (4), passes through the meniscus lens (2), and diaphragm (1), and is finally projected onto a display screen located forward thereof but not shown.

To evaluate the image-forming performance of the prior art T.V. projector of FIG. 2, specific values for various quantities will be given, assuming that the focal length, f, of the entire system is 100.0.

TABLE 1

(Reference Embodiment)
f = 100.0 Fno = 0.7 2ω = 45°

| Radius of Curvature | | Axial Distance | Refractive Index | Abbe Number |
|---|---|---|---|---|
| $r_1$ | ∞ | (aperture stop) | | |
| | | $d_1$  193.3 | | |
| $r_2$ | −91.52 | | | |
| | | $d_2$  9.0 | nd 1.5168 | νd 64.0 |
| $r_3$ | −123.48 | | | |
| | | $d_3$  123.9 | | |
| $r_4$ | −211.51 | | | |
| | | $d_4$  −123.1 | | |
| $r_5$ | −93.67 | (fluorescent target) | | | wherein $r_1$, $r_2$ denotes the radii of curvature of the surfaces arranged in the order of increasing distances from the display screen; $d_1$, $d_2$ denotes the axial distances between adjacent surfaces in the order of increasing distances from the display screen; nd represents the refractive index of the d-line of the meniscus lens, and νd represents the Abbe number of the d-line. The negative sign attached to the value of the air space $d_4$ stands for the direction back towards the display screen.

The display screen, on which an optical image is projected, has a radius of curvature of about 3,300. The screen is located at a distance of 2,500 from, and forward of the diaphragm. In this set-up, the projection magnification is about 26 times.

Figure 3A:
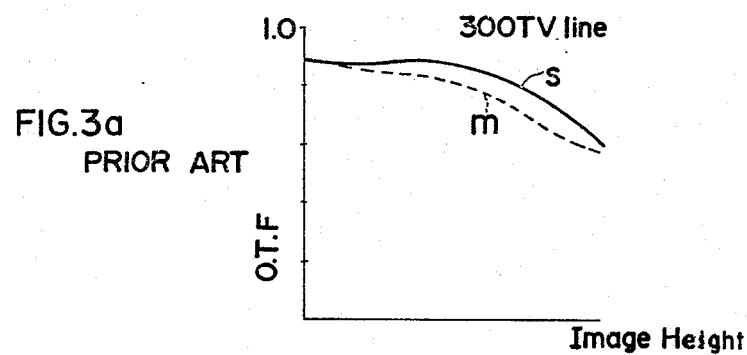
FIGS. 3a, 3b and 3c represent graphical plots showing the resolution of the television optical system of FIG. 2 with respect to various T.V. line resolutions.
Figure 3B:
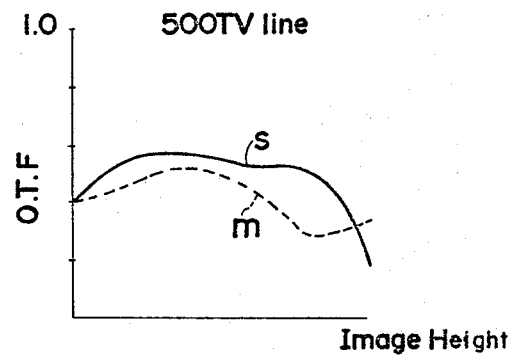
Figure 3C:
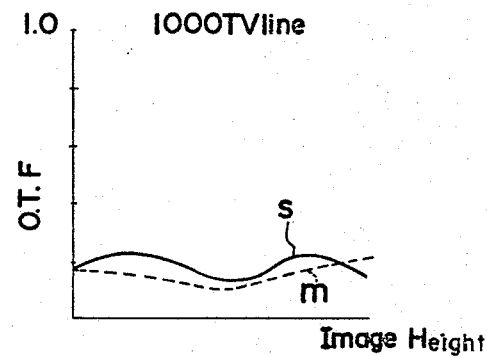

FIGS. 3 show the O.T.F. (Optical Transfer Function) values for images on the display screen which are obtained with a T.V. projector utilizing the above meniscus lens system. FIGS. 3a, 3b and 3c correspond to the T.V. resolutions of 300 T.V. lines, 500 T.V. lines and 1,000 T.V. lines, respectively, the O.T.F. values on the vertical axis being plotted against image heights from the center of the screen on the horizontal axis. In each of these several views of FIGS. 3, the dotted line (m) denotes the meridional pencil of rays and the solid line(s) is the sagittal pencil.

As will be apparent from FIGS. 3, the O.T.F. values are substantially "averaged" for each number of T.V. lines. Substantially uniform correction having been accomplished over the entire area of the display screen. However, the fact that the O.T.F. curve has a fairly low profile with 1,000 T.V. lines, taken together with the inevitable manufacturing and assembling tolerances, suggests that there is practically no effective resolution of a 1,000 T.V. line image.

Figure 4:
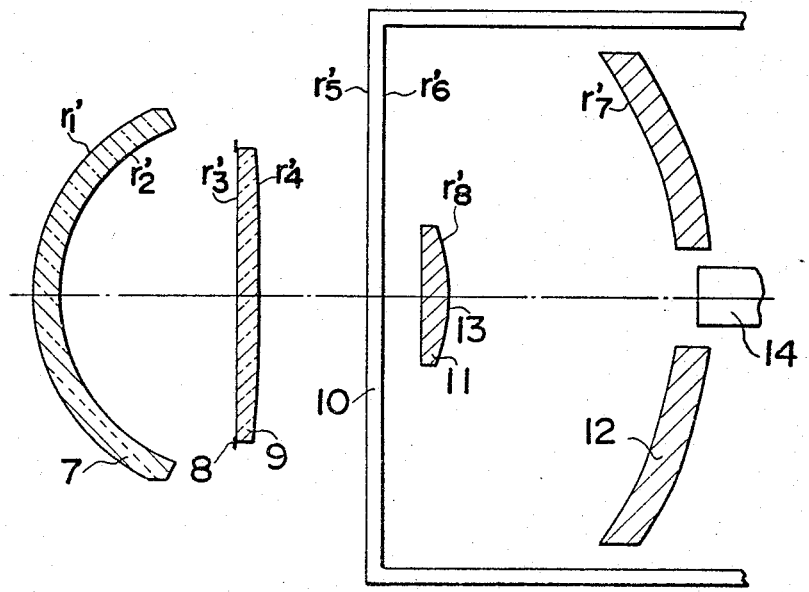
FIG. 4 represents a schematic cross sectional view of an embodiment of the present invention.

FIG. 4 is a schematic representation of an embodiment of this invention. From left to right, a meniscus lens (7); optical compensation plate (9); vacuum envelope (10); light emitting target (11) and concave mirror (12) form components defining or interfacing with the optical path.

According to this invention, in order to improve image plane characteristics in both the central and marginal areas of the display screen, an optical compensating plate (9) having at least an aspherical surface coefficient is incorporated into a meniscus lens system. The numerical values for this embodiment are given below.

TABLE 2

(Embodiment)
f = 100.0 Fno = 0.7 2ω = 45°

| Radius of Curvature | | Axial Distance | Refractive Index | Abbe Number |
|---|---|---|---|---|
| $r_1'$ | 104.43 | | | |
| | | $d_1'$  15.6 | $nd_1'$  1.5168 | $νd_1'$  64.0 |
| $r_2'$ | 89.02 | | | |
| | | $d_2'$  82.6 | | |
| $r_3'$ | ∞ | (aperture stop) | | |
| | | $d_3'$  10.0 | $nd_2'$  1.4914 | $νd_2'$  57.8 |
| $r_4'$ | −2511.9 | (aspherical surface) | | |
| | | $d_4'$  52.1 | | |
| $r_5'$ | ∞ | | | |
| | | $d_5'$  8.6 | $nd_3'$  1.5168 | $νd_3'$  64.0 |
| $r_6'$ | ∞ | | | |
| | | $d_6'$  149.9 | | |
| $r_7'$ | −207.48 | | | |
| | | $d_7'$  −111.3 | | |
| $r_8'$ | −96.83 | (fluorescent target) | | | wherein $r_1'$, $r_2'$ denote the radii of curvature of the surfaces in the order of increasing distances from the display screen; $d_1'$, $d_2'$ denote the axial distances between the adjacent surfaces in the order of increasing distances from the screen; $nd_1'$, $nd_2'$ and $nd_3'$ represent the refractive indices of the d-lines of the meniscus lens, correcting plate and glass bulb, respectively; and $νd_1'$, $νd_2'$ and $νd_3'$ represent the Abbe numbers of the d-lines. The negative sign attached to the value of the air space $d_7'$ stands for the direction toward the display screen.

The aspherical surface of the fourth surface $r_4'$ is expressed as a modified quadric, and is defined by the following equation:

$$X = \frac{C_o Y^2}{1 + (1 - C_o^2 Y^2)^{\frac{1}{2}}} + \sum_{i=2}^{5} C_i Y^{2i}$$

wherein X is the axial distance measured from the vertex of the fourth surface $r_4'$ toward the reflecting concave mirror; Y is the height from the optical axis to a given point on the aspherical surface; and $C_0$ is the paraxial radius of curvature. In the above equation, the values of aspherical surface coefficients $C_2$, $C_3$, $C_4$ and $C_5$ are as follows:

$C_2 = 0.439838 \times 10^{-7}$
$C_3 = -0.305694 \times 10^{-11}$
$C_4 = 0.129572 \times 10^{-14}$
$C_5 = -0.140204 \times 10^{-18}$ These values have been selected to optimize the correction of the spherical aberration and coma originating from the reflecting concave mirror in combination with the function of the meniscus lens.

In the embodiment illustrated in FIG. 4, the meniscus lens (7) and compensating plate (9) are located outside of the glass bulb (10) which houses an electron gun (14), a target (11) and a reflecting concave mirror (12), all vacuum-sealed. This arrangement helps to easily overcome any manufacturing assembling error. It should be understood that the reference numerals (8) and (13) denote a diaphragm and a fluorescent coating, respectively, and that the construction and placement of the display screen are the same as those shown in the embodiment depicted in FIG. 2.

Figure 5A:
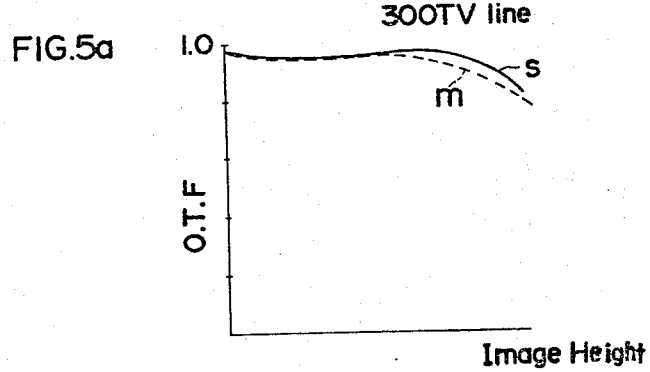
FIGS. 5a, 5b and 5c represent graphical plots showing the resolution of the system in FIG. 4 with respect to various T.V. line resolutions.
Figure 5B:
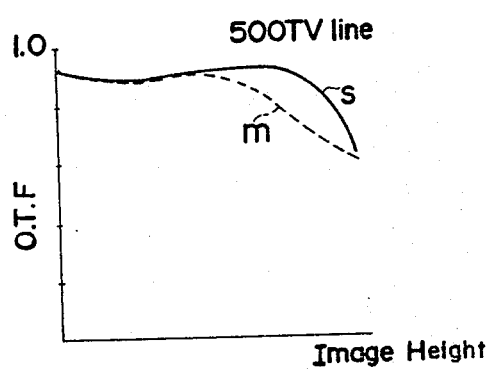
Figure 5C:
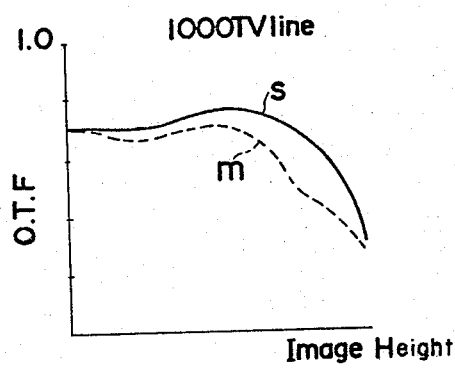

FIGS. 5a, 5b and 5c disclose the O.T.F. values of this embodiment. Comparison of these figures with FIGS. 3a, 3b and 3c will readily show that, because due consideration has been given to correction for spherical aberration and, particularly, for coma in FIGS. 5a, 5b and 5c, the O.T.F. characteristic over the entire area of the display screen has been markedly improved. FIG. 5c, in particular shows that the embodiment of the invention wherein the optical system has a resolution performance of over 1,000 TV lines, meets the performance requirement of a large-relative-aperature, high-grade video display.

While the compensating plate (9), shown in FIG. 4, is aspherical on one surface r4' only, it is easy for one skilled in the art to make the other surface r3' or both surfaces r3' and r4' aspherical, with comparable effects.

In constructing a reflecting optical system including a meniscus lens (7) and a compensating plate (9) having at least an aspherical surface, it is advantageous, in order that well-balanced correction may be accomplished over the whole area of the display screen, to ensure that, as in the embodiment illustrated, the meniscus lens is convex with respect to the screen and, at the same time, that the aspherical surface coefficient $C_2$ and the radius of curvature R (corresponding to $r_2'$ in the embodiment) of the surface of the meniscus lens facing the reflecting concave mirror satisfy the following conditions, with the overall focal length of the entire system being defined as f.

$$10^{-2}/f^4 < |C_2| < 10^2/f^4 \tag{1}$$

$$0.6f < |R| < 1.2f \tag{2}$$

Satisfactory aberration correction is possible when the above conditions are satisfied. The lower the order of aspherical coefficients, the greater influence they exert upon aberrations, and those coefficients are correlated in their contribution to aberration correction. If the aspherical surface coefficient $C_2$ is below the above-mentioned lower limit, aberration correction for the center of the screen is made difficult and if $C_2$ is beyond the upper limit defined above, coma increases in the zonal to marginal areas, making it difficult to correct for astigmatism. Furthermore, if the radius of curvature R of the meniscus lens facing the reflecting concave mirror is below the above-mentioned lower limit, coma in the zonal area increases to the extent that it cannot be easily corrected. On the other hand, if R is beyond the upper limit, astigmatism becomes so great that the balance between the central and marginal areas of the display screen is disturbed.

It will be apparent from the foregoing that, in this invention, comprising a meniscus lens and a compensating plate having at least one aspherical surface, there is obtained a large-aperture-ratio, wide-angle reflecting optical system providing a markedly improved image-forming performance over the whole area of the display screen. Moreover, because the meniscus lens and the aspherical correcting plate can be installed outside the vacuum tube, there is obtained a reflecting optical system with high manufacturing and assembling precision.

Since a person skilled in this field can vary the embodiment of the present invention once he is aware of the principals of this invention, the scope of the invention should be measured solely from the following claims.

What is claimed is:

1. In a projection television system including a light emitting target capable of providing a video image of a high resolution definition of 1,000 T.V. lines and a screen for realizing the projected video image for example generated by an electron gun exciting the target, an improvement in a reflecting optical system which defines an optical path for projecting the video image on the screen, comprising;
   a concave mirror for reflecting the image toward the screen;
   a meniscus lens located in the optical path between the concave mirror and the screen;
   at least one optical aspherical surface in the optical path, whereby the aspherical surface coefficient, $C_2$; radius of curvature of the inside surface of the meniscus lens, R, and the focal length, f, of the entire optical system satisfies the following conditions;

$$10^{-2}/f^4 < |C_2| < 10^2/f^4 \tag{1}$$

$$0.6f < |R| < 1.2f \tag{2}$$

these conditions providing a projection television system with a resolution of 1,000 T.V. lines on the screen.

2. The invention of claim 1 wherein the meniscus lens is convex towards the screen and located at the screen side of the aspherical surface along the optical path.

3. The invention of claim 1 further comprising a vacuum tube for enclosing the electron and the light emitting target, wherein the aspherical surface and the meniscus lens are located outside the vacuum tube.

4. The invention of claim 1 wherein a compensating plate has the aspherical surface.

5. In a projection television system including a light emitting target, a screen for realizing a projected video image for example, generated by an electron gun exciting the target and a concave mirror relatively positioned to the light emitting target for reflecting the video image formed on the target towards the screen, an optical system essential to the improvement on the T.V. resolution of the video image on the screen consisting of:
   an optical compensating plate having at least one aspherical surface located on an optical path between the concave mirror and the screen, and
   a meniscus lens convex to the screen side located on an optical path between the optical compensating plate and the screen, whereby a relatively uniform correction of aberration is provided across the image displayed on the screen, in which the aspherical surface coefficient, $C_2$, radius of curvature of the inside surface of the meniscus lens, R, and the focal length, f, of the entire optical system satisfy the following conditions:

$$10^{-2}/f^4 < |C_2| < 10^2/f^4 \quad (1)$$

$$0.6f < |R| < 1.2f \quad (2)$$

6. The invention of claim 5 further comprising a vacuum tube for enclosing the electron gun and the light emitting target, wherein the optical compensating plate and the meniscus lens are located outside the vacuum tube.

7. The invention of claim 5, wherein the optical compensating plate has only one aspherical surface.

8. The invention of claim 7, wherein the aspherical surface is located on the concave mirror side.

9. An optical projection system having an optical axis for magnifying a video image of a fluorescent target television system having the following design parameters;

| | f = 100.0 Fno = 0.7 2ω = 45° | | | |
|---|---|---|---|---|
| Radius of Curvature | Axial Distance | | Refractive Index | Abbe Number |
| $r_1'$ 104.43 | | | | |
| | $d_1'$ 15.6 | $nd_1'$ | 1.5168 | $vd_1'$ 64.0 |
| $r_2'$ 89.02 | | | | |

| | f = 100.0 Fno = 0.7 2ω = 45° | | | |
|---|---|---|---|---|
| Radius of Curvature | Axial Distance | | Refractive Index | Abbe Number |
| | $d_2'$ 82.6 (aperture stop) | | | |
| $r_3'$ ∞ | | | | |
| | $d_3'$ 10.0 | $nd_2'$ | 1.4914 | $vd_2'$ 57.8 |
| $r_4'$ −2511.9 | (aspherical surface) | | | |
| | $d_4'$ 52.1 | | | |
| $r_5'$ ∞ | | | | |
| | $d_5'$ 8.6 | $nd_3'$ | 1.5168 | $vd_3'$ 64.0 |
| $r_6'$ ∞ | | | | |
| | $d_6'$ 149.9 | | | |
| $r_7'$ −207.48 | (reflecting concave mirror) | | | |
| | $d_7'$ −111.3 | | | |
| $r_8'$ −96.83 | (fluorescent target) | | | | wherein the aspherical surface is defined as;

$$X = \frac{C_o Y^2}{1 + (1 - C_o^2 Y^2)^{\frac{1}{2}}} + \sum_{i=2}^{5} C_i Y^{2i}$$

where X is an axial distance measured from the vertex of the fourth surface, $r_4'$ toward the reflecting concave mirror; Y is the height from the optical axis to a given point on the aspherical surface; $C_0$ is the paraxial radius of curvature and the values of the aspherical surface coefficients $C_2$, $C_3$, $C_4$ and $C_5$ are as follows:

$C_2 = 0.439838 \times 10^{-7}$
$C_3 = -0.305694 \times 10^{-11}$
$C_4 = 0.129572 \times 10^{-14}$
$C_5 = 0.140204 \times 10^{-18}$.

* * * * *